United States Patent
Frankfurth

(10) Patent No.: US 11,217,090 B2
(45) Date of Patent: Jan. 4, 2022

(54) LEARNED INTERSECTION MAP FROM LONG TERM SENSOR DATA

(71) Applicant: Continental Automotive Systems, Inc., Auburn Hills, MI (US)

(72) Inventor: Joshua David Frankfurth, San Jose, CA (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 191 days.

(21) Appl. No.: 16/579,970

(22) Filed: Sep. 24, 2019

(65) Prior Publication Data

US 2020/0211371 A1 Jul. 2, 2020

Related U.S. Application Data

(60) Provisional application No. 62/785,327, filed on Dec. 27, 2018.

(51) Int. Cl.
| | | |
|---|---|---|
| *G08G 1/00* | (2006.01) | |
| *G08G 1/01* | (2006.01) | |
| *G06K 9/00* | (2006.01) | |
| *G08G 1/04* | (2006.01) | |
| *G08G 1/052* | (2006.01) | |

(52) U.S. Cl.
CPC ....... *G08G 1/0116* (2013.01); *G06K 9/00785* (2013.01); *G08G 1/0129* (2013.01); *G08G 1/0141* (2013.01); *G08G 1/04* (2013.01); *G08G 1/052* (2013.01)

(58) Field of Classification Search
CPC ...... G08G 1/0116; G08G 1/0129; G08G 1/04; G08G 1/052; G08G 1/0141; G01C 21/30; G06K 9/00786
See application file for complete search history.

(56) References Cited

U.S. PATENT DOCUMENTS

| | | | | |
|---|---|---|---|---|
| 8,855,904 | B1* | 10/2014 | Templeton | G08G 1/0141 |
| | | | | 701/119 |
| 10,803,742 | B2* | 10/2020 | Hofman | G08G 1/0145 |
| 2014/0307087 | A1* | 10/2014 | Evanitsky | G08G 1/052 |
| | | | | 348/143 |
| 2015/0325119 | A1 | 11/2015 | Lehnertz | |
| 2016/0027299 | A1* | 1/2016 | Raamot | G08G 1/08 |
| | | | | 340/917 |
| 2018/0329418 | A1* | 11/2018 | Baalke | G05D 1/0246 |
| 2019/0197902 | A1* | 6/2019 | Shin | G05D 1/0214 |
| 2019/0212749 | A1* | 7/2019 | Chen | B62D 15/0255 |
| 2020/0001875 | A1* | 1/2020 | Kato | B60W 50/14 |
| 2020/0026845 | A1* | 1/2020 | Jeon | G06K 9/00771 |
| 2020/0108833 | A1* | 4/2020 | Sim | G08G 1/09623 |
| 2020/0211371 | A1* | 7/2020 | Frankfurth | G06K 9/00785 |

(Continued)

OTHER PUBLICATIONS

International Search Report and the Written Opinion of the International Searching Authority dated Apr. 2, 2020 for the counterpart PCT Application No. PCT/2019066140.

(Continued)

*Primary Examiner* — Ojiako K Nwugo

(57) ABSTRACT

A system and method includes mounting one or more sensors to an infrastructure component, identifying movement patterns in an intersection adjacent to the infrastructure component, and creating a map of the intersection based on the movement patterns.

14 Claims, 3 Drawing Sheets

(56) References Cited

U.S. PATENT DOCUMENTS

2020/0242922 A1* 7/2020 Dulberg ........... G08G 1/096783
2020/0285244 A1* 9/2020 Gier ..................... G05D 1/0242
2020/0353920 A1* 11/2020 Sun ....................... B60W 30/09
2021/0122373 A1* 4/2021 Dax .................... B60W 40/105

OTHER PUBLICATIONS

Masmoudi Imen et al: "Trajectory analysis for parking lot vacancy detection system", IET Intelligent Transport Systems, The Institution of Engineering and Technology, Michael Faraday House, Six Hills Way, Stevenage, Herts. SG1 2AY, UK, vol. 10, No. 7, Sep. 1, 2016 (Sep. 1, 2016), pp. 461-468, XP006058058.

* cited by examiner

LEARNED INTERSECTION MAP FROM LONG TERM SENSOR DATA

PRIORITY CLAIM

This application claims the benefit of U.S. Provisional Application No. 62/785,327 filed on Dec. 27, 2018.

TECHNICAL FIELD

The subject invention provides a system and method for identifying movement patterns in an intersection and creating a map of the intersection based on learned movement patterns.

BACKGROUND

Environmental sensor systems provide data to autonomous vehicles such that the vehicles can follow lanes, avoid collisions, re-route around traffic, etc. These systems can also communicate data to driver-operated vehicles to provide updates regarding weather, traffic, road conditions, emergency warnings, etc. The sensor systems include various types of sensors that are mounted to infrastructure (traffic lights, signs, parking meters, etc.) near intersections, along roads, and on buildings. The sensor systems are used to recognize lane and crosswalk boundaries, and can also be used to determine distances between vehicles and/or other objects that are stationary or moving in or along the road.

Road intersections are one of the more complicated areas to address. In urban areas, for example, in addition to having intersecting roads for traffic flow, there are crosswalks, pedestrians, bike lanes, parking areas, etc. that each have to be mapped with precision such that autonomous vehicles can successfully navigate the intersection. Each intersection is unique and has interesting points that need to be identified, e.g. traffic light or sign placement, road curvature, parking patterns, etc. All of this information must be preprogrammed into a control system such that there is an accurate map of the intersection. This is expensive and labor intensive.

SUMMARY

In one exemplary embodiment, a method includes mounting one or more sensors to an infrastructure component, identifying movement patterns in an intersection adjacent to the infrastructure component, and creating a map of the intersection based on the movement patterns.

In another embodiment according to the previous embodiment, the method includes identifying a vehicle lane when one of the movement patterns comprises identifying objects repeatedly moving through a same area at a speed that is greater than a predetermined speed.

In another embodiment according to any of the previous embodiments, the method includes identifying a crosswalk when one of the movement patterns comprises identifying objects repeatedly moving through a same area at a speed that is less than a predetermined speed.

In another embodiment according to any of the previous embodiments, the method includes identifying a parking space when one of the movement patterns comprises identifying objects repeatedly moving back and forth in a common area at a speed that is less than a predetermined speed.

In another embodiment according to any of the previous embodiments, the method includes mounting the sensors to a traffic light.

In another embodiment according to any of the previous embodiments, the method includes prioritizing objects within the map of the intersection, identifying anomalies within the intersection, and broadcasting information regarding the anomalies over a communication system.

In another embodiment according to any of the previous embodiments, the method includes communicating sensor data from the sensors to a controller configured with an algorithm to create a learned map of the intersection over time by identifying and categorizing patterns that are sensed by the sensors.

In another embodiment according to any of the previous embodiments, the method includes providing a wireless communication system that receives the learned map from the controller and broadcasts the learned map to other vehicles, infrastructure devices, and/or pedestrians.

In another embodiment according to any of the previous embodiments, the one or more sensors comprises one or more of a motion sensor, optical camera sensor, radar sensor, lidar sensor, laser sensor and/or ultrasonic sensor.

In another embodiment according to any of the previous embodiments, the method includes mounting the sensors to traffic lights, signs, buildings, and/or street lights.

In another exemplary embodiment, a system includes a plurality of sensors configured to be mounted to at least one infrastructure component, and a controller configured to receive sensor data and use the sensor data to identify movement patterns in an intersection adjacent to the infrastructure component, and wherein the controller maps the intersection based on the movement patterns.

In another embodiment according to any of the previous embodiments, the controller is configured to identify a vehicle lane when one of the movement patterns comprises identifying objects repeatedly moving through a same area at a speed that is greater than a predetermined speed.

In another embodiment according to any of the previous embodiments, the controller is configured to identify a crosswalk when one of the movement patterns comprises identifying objects repeatedly moving through a same area at a speed that is less than a predetermined speed.

In another embodiment according to any of the previous embodiment, the controller is configured to identify a parking space when one of the movement patterns comprises identifying objects repeatedly moving back and forth in a common area at a speed that is less than a predetermined speed.

In another embodiment according to any of the previous embodiments, the plurality of sensors are mounted to one or more traffic lights or signs.

In another embodiment according to any of the previous embodiments, the controller is configured to prioritize objects within a map of the intersection generated by the controller based on the sensor data, identify anomalies within the intersection, and broadcast information regarding the anomalies over a communication system.

In another embodiment according to any of the previous embodiments, the controller is configured with an algorithm to create a learned map of the intersection over time by identifying and categorizing patterns that are sensed by the sensors.

In another embodiment according to any of the previous embodiments, the system includes a wireless communication system that receives the learned map from the controller and broadcasts the learned map to other vehicles, infrastructure devices, and/or pedestrians.

In another embodiment according to any of the previous embodiments, the plurality of sensors comprises one or more of a motion sensor, optical camera sensor, radar sensor, lidar sensor, laser sensor and/or ultrasonic sensor.

In another embodiment according to any of the previous embodiments, the sensors are mounted to traffic lights, signs, buildings, and/or street lights.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION OF AN EMBODIMENT

The subject invention provides a system and method that includes mounting one or more sensors to an infrastructure component, identifying movement patterns in an intersection adjacent to the infrastructure component, and creating a map of the intersection based on the movement patterns. Examples of movement patterns can include any of the following. A vehicle lane can be identified when one of the movement patterns comprises identifying objects repeatedly moving through a same area at a speed that is greater than a predetermined speed, e.g. a faster speed that would be associated with a vehicle. A crosswalk can be identified when one of the movement patterns comprises identifying objects repeatedly moving through a same area at a speed that is less than a predetermined speed, e.g. a slow speed associated with walking. A parking space can be identified when one of the movement patterns comprises identifying objects repeatedly moving back and forth in a common area at a speed that is less than a predetermined speed, e.g. forward and reverse maneuvering in a small defined area.

Figure 1:
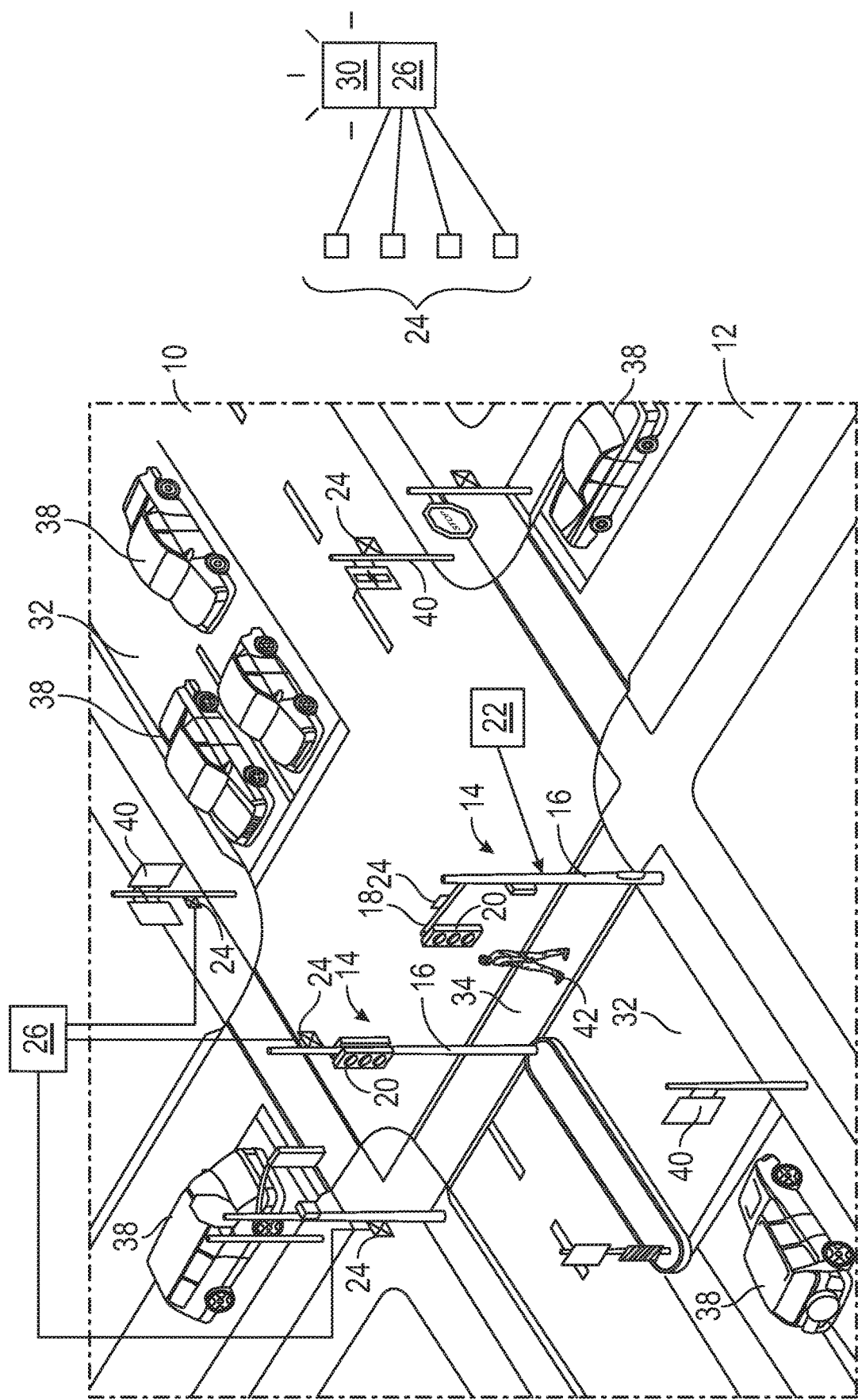
FIG. 1 is a view of an intersection incorporating a system according to the invention.
Figure 2:
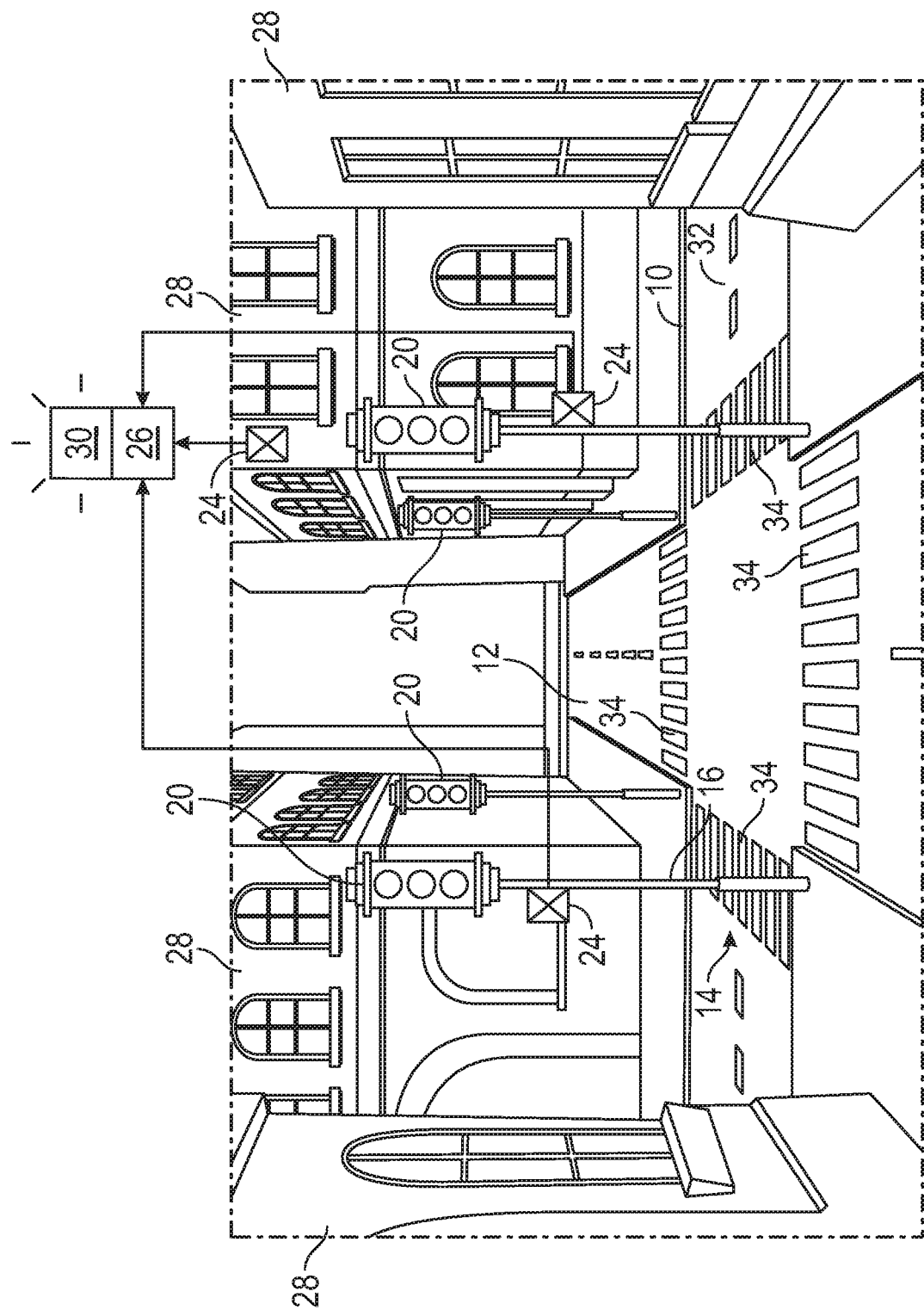
FIG. 2 is an example of another intersection incorporating a system according to the invention.

FIGS. 1 and 2 show an intersection of a first road 10 with a second road 12. A traffic light system 14 is positioned at a corner between the first 10 and second 12 roads or in a central location between the roads 10, 12. In one example, the traffic light system 14 includes at least one main pole 16 that extends upwardly from the ground and supports one or more secondary poles or traffic arms 18. Each traffic arm 18 includes one or more traffic lights 20. The main pole 16 itself may include the traffic light without requiring traffic arms. Or, the main pole 16 may also include traffic lights 20 in addition to those on the traffic arms 18. Optionally, the traffic lights 20 can be suspended on a cable or wire extending across the intersection. A control system 22 controls operation of the traffic lights 20 such that vehicles 38 can move efficiently through the intersection without colliding with each other.

Ambient or environmental sensors 24 are mounted to infrastructure, such as buildings 28, signs 40, street lights, the pole 16, arms 18, or lights 20. A system 26 uses data from the sensors 24, which track movement patterns over time, to learn and create a map of the intersection as a fixed environment. Thus, the sensors 24 are used to monitor movement patterns and speed to identify the location of fixed structures or areas, e.g. lights, hydrants, signs, lanes, crosswalks, parking spaces, etc., such that moving objects (pedestrians 42, bikers, vehicles 38, etc.) can have a frame of reference. This is important for Advanced Driver Assistance Systems (ADAS) and for autonomous vehicles. In one example, the system 26 uses ambient/environmental sensors 24 that comprise one or more of the following: motion sensor, optical camera sensor, radar sensor, lidar sensor, laser sensor and/or ultrasonic sensor. These sensors 24 capture location and movement information from pedestrians 42 and vehicles 38 in relation to other vehicles, pedestrians, or infrastructure to create a map of the intersection. The sensors 24 track this location and movement information over time and the system 26 is configured to compile this information to recognize patterns of location/movement. These patterns can be used to identify lane boundaries, crosswalk boundaries, etc. with precise accuracy based on the sensors that are actually at the intersection.

This information can be used to create a map of the intersection and this can then be broadcast over a wireless communication system 30. One example of a communication system is referred to as "vehicle-to-everything (V2X)" communication, and includes the passing of information from a vehicle 38 to any entity that may affect the vehicle 38, and vice versa. It is a vehicular communication system that incorporates other more specific types of communication such as V2I (vehicle-to-infrastructure), V2N (vehicle-to-network), V2V (vehicle-to-vehicle), V2P (vehicle-to-pedestrian), V2D (vehicle-to-device), and V2G (vehicle-to-grid). This type of communication improves road safety and traffic efficiency, as well as providing energy savings.

The communication system 30 wirelessly communicates via the V2X communication systems to exchange information with surrounding vehicles 38 or infrastructure devices. The V2X messages sent by the vehicles 38 usually comprise at least an absolute position, an absolute speed, and a piece of information about the direction of travel. The V2X messages sent by the system 26 usually comprise the map of the intersection that identifies lane locations, crosswalk locations, parking space locations, etc. For the V2X communication system to send and/or receive messages and/or information, the system can use one or more of the following connection classes: WLAN connection, e.g. based on IEEE 802.11, ISM (Industrial, Scientific, Medical Band) connection, Bluetooth® connection, ZigBee connection, UWB (ultrawide band) connection, WiMax® (Worldwide Interoperability for Microwave Access) connection, LTE-V2X, Dedicated Short Range Communications (DSRC), infrared connection, mobile radio connection, and/or radar-based communication.

Figure 3:
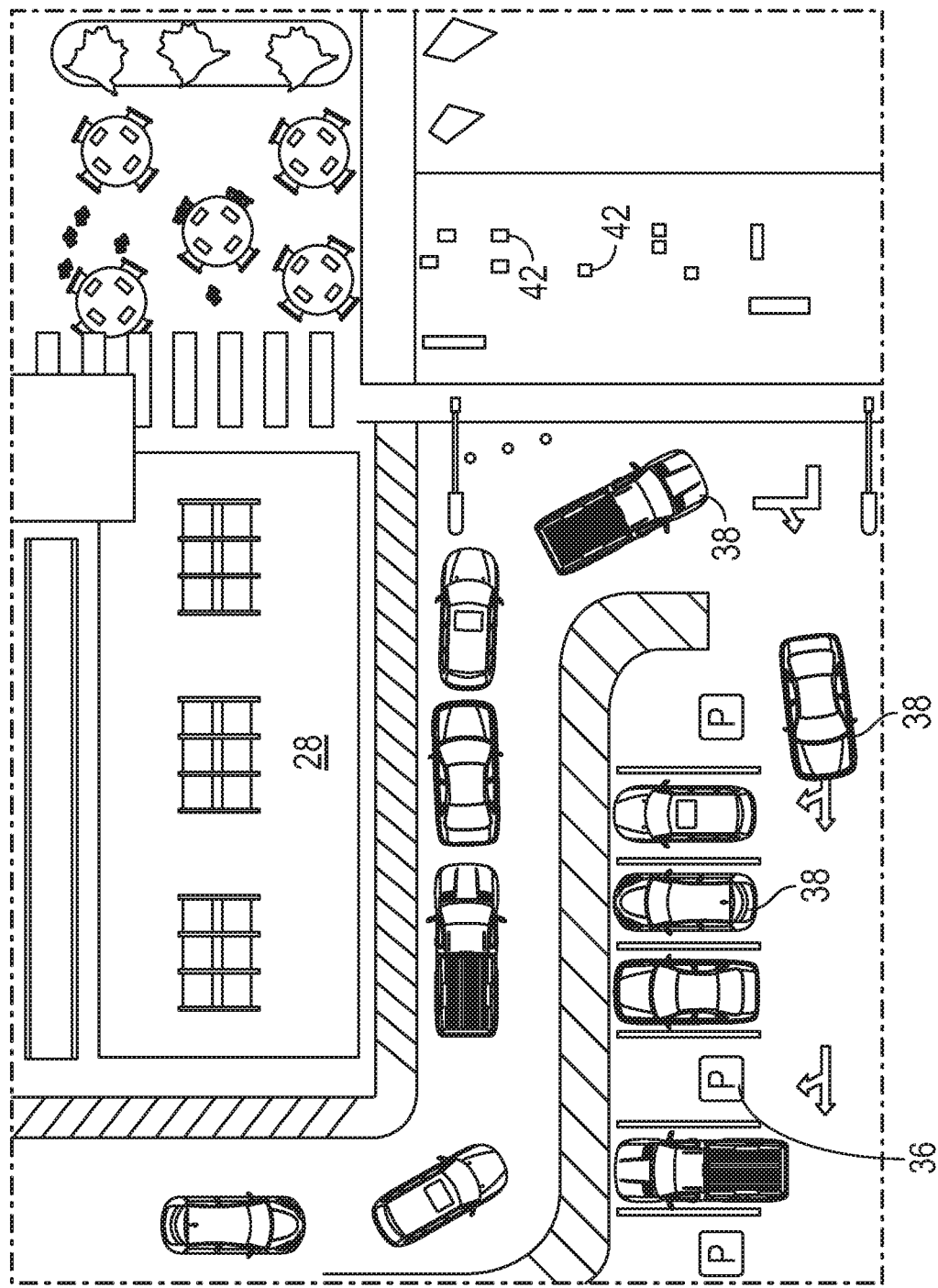
FIG. 3 is an example of a parking area incorporating a system according to the invention.

It is important that the environmental sensors 24 that are at the actual intersection location provide the data that is used to create the intersection map, such that the map is based on real and observed object behavior. As such, it is not required to calibrate or create a map of an intersection that is pre-programmed into the system 26. Instead, the system 26 itself learns the actual movement of the traffic participants (vehicles 38, pedestrians 42, bikers, etc.) within the intersection to provide an accurate representation of the intersection. This avoids any potential of inaccurate data being used to create a map ahead of time. The subject invention uses an algorithm to create a learned map of the intersection over time by observing patterns that are seen by the sensors 24. For example, if a sensor sees objects moving quickly through the same area over and over again, a vehicle lane 32 can be identified. If the sensors observe consistently slow moving objects in a certain area, a pedestrian crosswalk 34 can be identified. If the sensors observe large objects driving both forwards and backwards in a certain area, parking spaces 36 can be identified as shown in FIG. 3.

The system 26 continues to compile the sensor data over time. This allows the system 26 to identify any changes in the patterns such that the intersection map can be adjusted as needed. This new or adjusted map configuration can be broadcast over the V2X communication system 30. Thus, real-time data is being used for each unique intersection. This provides improved accuracy and can account for any anomalies that may occur. For example, a delivery truck may be doubled parked in the street for a delivery e.g. parked in a vehicle lane and not in a parking space, such that cargo can be loaded or unloaded. A vehicle 38 that may be turning onto that street cannot "see" that the truck is blocking a lane. The system 26 uses the data from the sensors 24 to identify that there is an object that needs to be avoided and broadcasts this information via V2X.

The system 26 is also configured to prioritize objects within the learned map of the intersection such that the anomalies within the intersection can be identified. For example, the doubled parked delivery van would be given a higher priority over other incoming data, such as regular traffic flow, for example. The system 26 would be able to quickly identify this traffic blocking object such that this information could then be broadcasted via the communication system 30. This allows vehicles 38 such as autonomous vehicles for example, to have real time information about anomalies in the intersection and streets surrounding the intersection prior to the vehicle 38 actually entering the intersection. This could also be useful for large parking lots where vehicles 38 driving in the wrong direction or driving across multiple parking spaces can be easily identified using the data from the sensors 24.

The system 26 can be a separate system or can be incorporated as part of the control system 22 for the traffic lights 20. The system(s) 26 can include one or more controllers comprising a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The controller can be a custom made or commercially available processor, a central processing unit (CPU), an auxiliary processor among several processors associated with the computing device, a semiconductor based microprocessor (in the form of a microchip or chip set), or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The controller can be configured to execute software stored within the memory, to communicate data to and from the memory, and to generally control operations of the computing device pursuant to the software. Software in memory, in whole or in part, is read by the processor, perhaps buffered within the processor, and then executed.

As discussed above, the system 26 uses sensors 24 to observe traffic participant behavior patterns over time to create an accurate map of the intersection. The subject invention uses an algorithm to create the learned map of the intersection over time by identifying and categorizing the patterns that are seen by the sensors 24. One of ordinary skill in the art would be able configure a system controller with such an algorithm. This is beneficial over other concepts that require that the intersection be programmed with all the data upfront identifying where legal markings are on the street. The advantage with the subject invention is that the system 26 learns the behavior of the intersection rather than being pre-programmed with the intersection information that may be inaccurate. Additionally, as every intersection is different, there is no need to manually specify where any unique or interesting points are in the intersection, the system 26 identifies them on its own by observing the repeated patterns over time.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. A method comprising:
    mounting one or more sensors to an infrastructure component;
    identifying movement patterns in an intersection adjacent to the infrastructure component; and
    creating a map of the intersection based on the movement patterns,
    wherein identifying the movement patterns in the intersection adjacent to the infrastructure component comprises:
        identifying a vehicle lane when one of the movement patterns comprises objects repeatedly moving through a same area at a speed that is greater than a predetermined speed;
        identifying a crosswalk when one of the movement patterns comprises objects repeatedly moving through a same area at a speed that is less than a predetermined speed; and
        identifying a parking space when one of the movement patterns comprises objects repeatedly moving back and forth in a common area at a speed that is less than a predetermined speed.

2. The method according to claim 1, wherein the infrastructure component comprises a traffic light.

3. The method according to claim 1, further comprising:
    prioritizing objects within the map of the intersection;
    identifying anomalies within the intersection; and
    broadcasting information regarding the anomalies over a communication system.

4. The method according to claim 1, further comprising:
    communicating sensor data from the one or more sensors to a controller configured with an algorithm to create a learned map of the intersection over time by identifying and categorizing the movement patterns that are sensed by the one or more sensors.

5. The method according to claim 4, further comprising:
    receiving by a wireless communication system the learned map from the controller; and
    broadcasting the learned map to other vehicles, infrastructure devices, and/or pedestrians.

6. The method according to claim 1, wherein the one or more sensors comprises one or more of a motion sensor, optical camera sensor, radar sensor, lidar sensor, laser sensor and/or ultrasonic sensor.

7. The method according to claim 6, wherein the infrastructure component comprises traffic lights, signs, buildings, and/or street lights.

8. A system comprising:
    a plurality of sensors configured to be mounted to at least one infrastructure component; and
    a controller configured to receive sensor data from the plurality of sensors, use the sensor data to identify movement patterns in an intersection adjacent to the infrastructure component, and create a map of the intersection based on the movement patterns,
    wherein the controller is configured to identify a vehicle lane when one of the movement patterns comprises objects repeatedly moving through a same area at a speed that is greater than a predetermined speed, identify a crosswalk when one of the movement patterns comprises objects repeatedly moving through a same area at a speed that is less than a predetermined speed, and identify a parking space when one of the movement patterns comprises objects repeatedly moving back and forth in a common area at a speed that is less than a predetermined speed.

9. The system according to claim 8, wherein the infrastructure component comprises one or more traffic lights or signs.

10. The system according to claim 8, wherein the controller is configured to:
    prioritize objects within a map of the intersection generated by the controller based on the sensor data,
    identify anomalies within the intersection, and
    broadcast information regarding the anomalies over a communication system.

11. The system according to claim 8, wherein the controller is configured with an algorithm to create a learned map of the intersection over time by identifying and categorizing the movement patterns that are sensed by the plurality of sensors.

12. The system according to claim 11, further comprising:
    a wireless communication system configured to receive the learned map from the controller and broadcast the learned map to other vehicles, infrastructure devices, and/or pedestrians.

13. The system according to claim 8, wherein the plurality of sensors comprises one or more of a motion sensor, optical camera sensor, radar sensor, lidar sensor, laser sensor and/or ultrasonic sensor.

14. The system according to claim 13, wherein to the infrastructure component comprises traffic lights, signs, buildings, and/or street lights.

* * * * *